United States Patent [19]

Nilsmar

[11] 4,152,800
[45] May 8, 1979

[54] SLUDGE SUCTION UNIT FOR SETTLING BASINS

[75] Inventor: Nils O. Nilsmar, Stockholm, Sweden

[73] Assignee: Maskin AB N.A. Eie, Bandhagen, Sweden

[21] Appl. No.: 850,682

[22] Filed: Nov. 11, 1977

[30] Foreign Application Priority Data

Nov. 18, 1976 [SE] Sweden ............................ 76129261

[51] Int. Cl.² .............................................. C02C 1/36
[52] U.S. Cl. ......................................... 15/1.7; 37/59; 134/21; 210/242 R
[58] Field of Search ...................... 15/1.7; 210/242 R; 134/21; 37/59

[56] References Cited

U.S. PATENT DOCUMENTS

| 3,254,355 | 6/1966 | Shaw | 15/1.7 |
| 3,416,176 | 12/1968 | Ravitts | 15/1.7 |
| 3,659,712 | 5/1972 | Chaplin | 210/242 R |

FOREIGN PATENT DOCUMENTS

7410937 10/1976 Sweden ....................................... 15/1.7

*Primary Examiner*—Edward L. Roberts
*Attorney, Agent, or Firm*—Charles A. Laff; J. Warren Whitesel; Howard B. Rockman

[57] ABSTRACT

A continually operating automatic sludge suction unit for use in withdrawing sludge from the bottom of a primarily rectangular or square basin. The unit is controlled for zigzag movement on the surface of liquid in the basin by means of cables and cable guides, and a pump suspended in a cable from a float included in the unit automatically follows any irregularities at the bottom of the basin. A counterweight is included for ensuring smooth movement of the unit on said surface.

6 Claims, 9 Drawing Figures

SLUDGE SUCTION UNIT FOR SETTLING BASINS

BACKGROUND OF THE INVENTION

1. Field of the Invention

This invention refers to settling basins and particularly to sludge suction units intended for use in such basins.

2. Description of the Prior Art

Sludge suction equipment for manual operation in removing sediment from basins and to a certain extent automatic operation has been in use for quite some time. However, in cases when the sludge suction equipment has included a hose and the equipment has been propelled by means of cables, it has not been possible to achieve automatic operation up to now.

SUMMARY OF THE INVENTION

The object of the present invention is to provide a completely automatic sludge suction unit which operates continually. The unit is controlled by cables that are positively guided, and have constant lengths regardless of which position the sludge suction unit takes. Thus extremely exact guidance, smooth power transmission, no slippage, and automatic control that is reliable in operation are achieved. The sludge pump of the sludge suction unit is suspended in a hoist block, and this makes it possible for the sludge pump to follow the outline of the bottom by means of a specific sensing device. The means by which the object set forth are achieved are disclosed in the accompanying claims.

BRIEF DESCRIPTION OF THE DRAWINGS

The invention will be described more specifically below with reference to the accompanying drawings, in which.

The same reference numerals have been utilized in the various figures wherever possible.

DESCRIPTION OF THE PREFERRED EMBODIMENT

Figure 1:
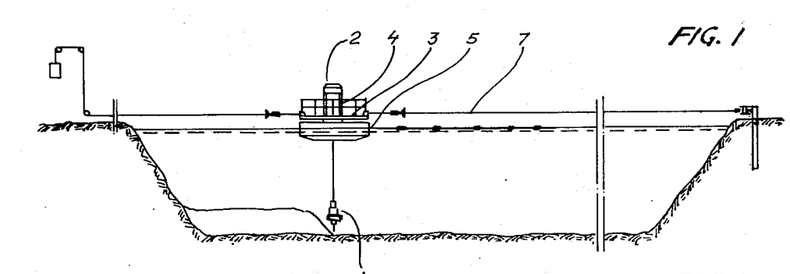
FIG. 1 shows a cross section of a settling basin which is provided with a sludge suction unit in accordance with the invention.
Figure 2:
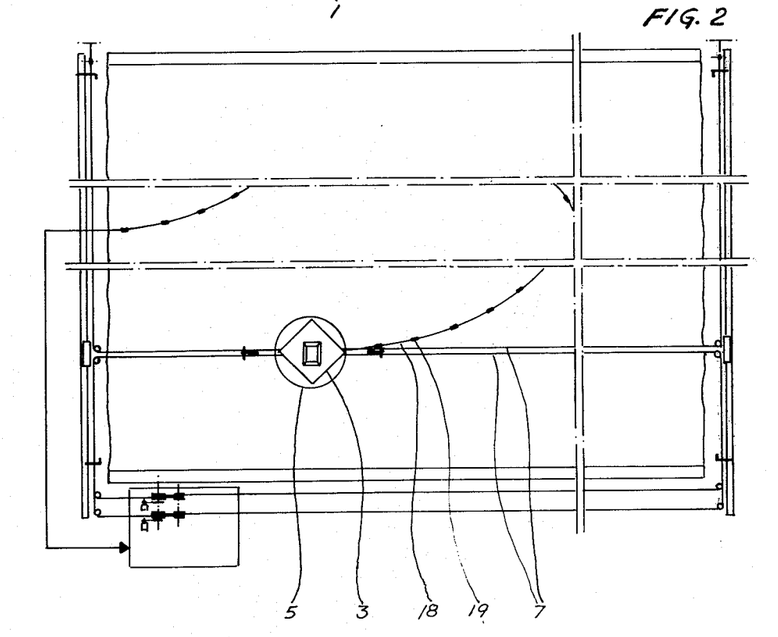
FIG. 2 shows a plan of the same settling basin and unit as FIG. 1, wherein it may be seen that the basin is substantially rectangular.
Figure 3:
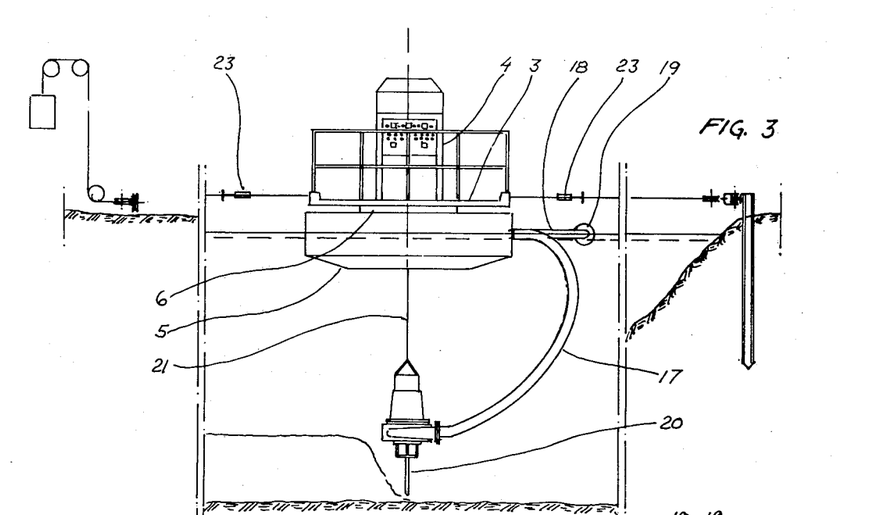
FIG. 3 shows the sludge suction unit proper on an enlarged scale and in elevation.
Figure 4:
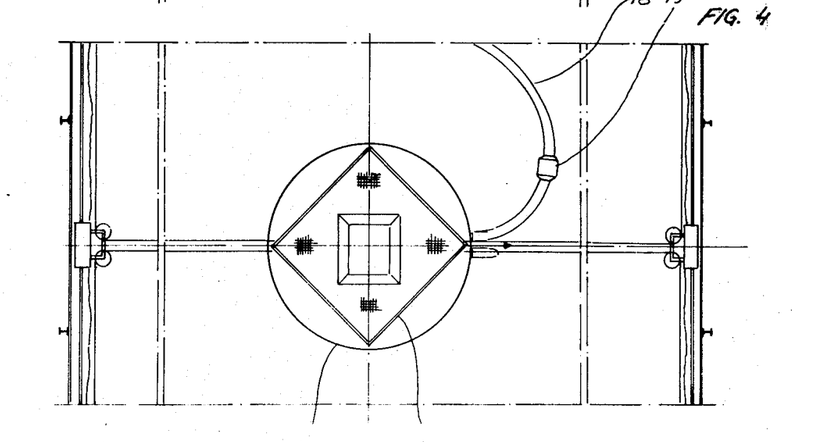
FIG. 4 shows the sludge suction unit of FIG. 3 as viewed from above.

As many be seen in FIG. 1, a submersible sludge pump 1, which may be of any type known per se, is suspended in a pump tower 4 by means of a hoist block 2. The pump tower 4 is located on a platform 3 associated with a float which floats on the surface of the liquid in a settling basin. FIG. 2 shows the float as viewed from above. FIGS. 3 and 4 show the float on an enlarged scale as viewed from the side and above, respectively. As may be seen particularly well in FIGS. 3 and 4, the bottom portion 5 of the float is circular, and float is mounted to the platform 3 by means of a roller path 6. Thus, the lower portion 5 of the float can rotate freely with regard to the platform 3. The sludge pump 1 and the platform 3 are interconnected by means of a cable 21, which will be discussed more specifically below, and also by means of a flexible and pliable spiral hose 17 having the purpose of conveying sludge which is drawn up from the bottom of the basin to the lower portion 5 of the float, at which lower portion spoil line on hose 17 is connected to a hose 18 which floats on the surface of the basin in consequence of the last-mentioned hose being provided with float members 19. Electric leads and control leads are attached to the bottom side of the hose 18. The hose 18 conveys the withdrawn sludge to a sludge box which may be located ashore. As the result of the circular lower portion 5 of the float being capable of rotating freely in regard to the platform 3 the hose 18 will always be connected to the slude box without any danger of the hose becoming entangled.

Figure 5:
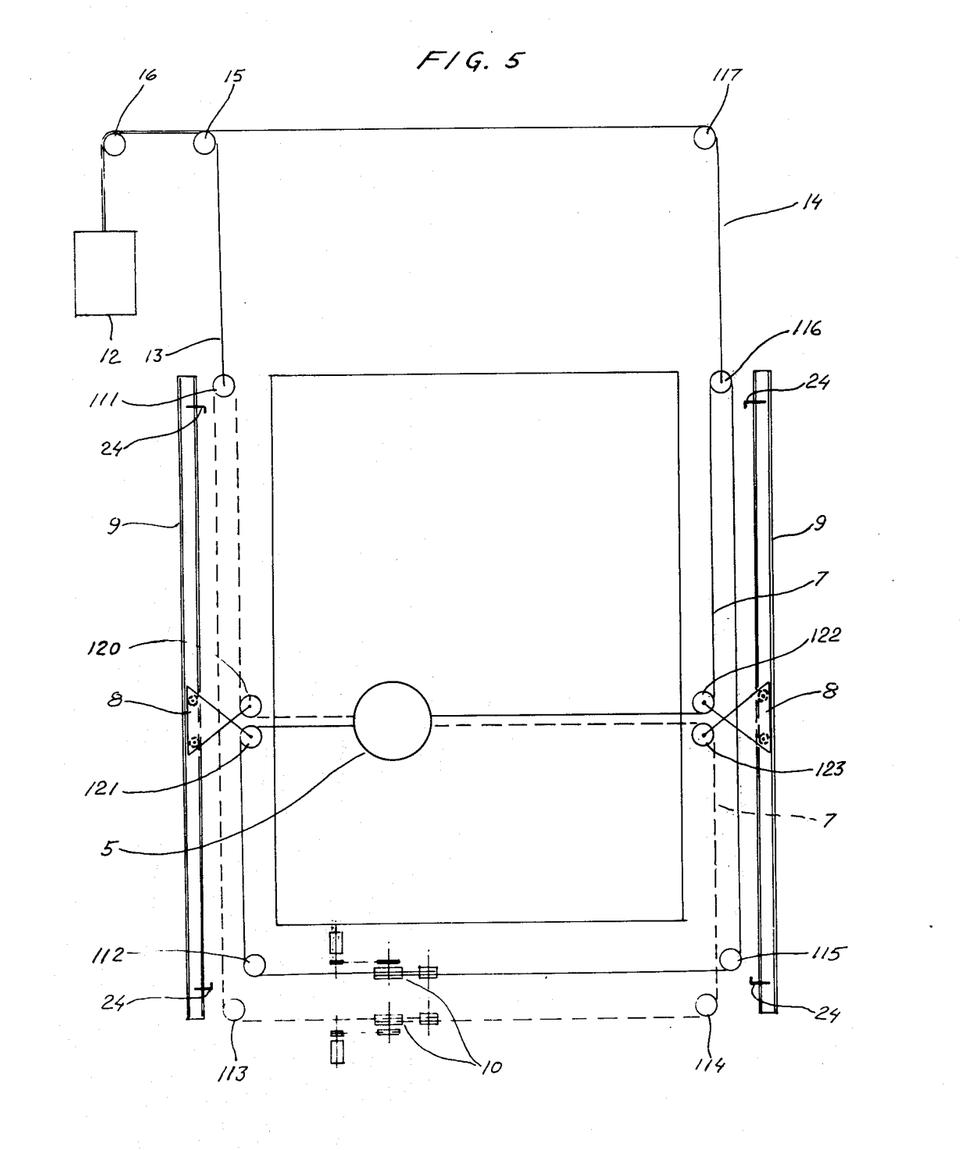
FIG. 5 illustrates the manner in which the sludge suction unit is propelled by means of cables, wherein it is to be pointed out that the travel movement can be carried out both entirely automatically and manually and that the sludge suction unit can be designed for being propelled in two directions at right angles to each other.

As may be seen in FIGS. 1–4, respectively, and still better in FIG. 5, the sludge suction unit may be conveyed in a rediprocating movement in the settling basin by means of a capable guide arrangement comprising two cables 7, preferably of steel, and also two cable guide carriages 8, which are provided with cable control wheels 120, 121 and 122, 123, respectively, for the cables 7 and each of which runs in an individual cable guide beam 9. The cables 7 are propelled by two drive motors 10 which to advantage may be provided with variators. Furthermore, the cables are controlled by a number of cable control wheels 111-116 essentially located outside the corners of the basin, as may be seen in FIG. 5. The cables are held taut by means of a couterweight 12 which is connected to the cable control wheels 111 and 116 at one of the settling basin over two cables 13 and 14 which extend over cable control wheels 15, 16 and 117, respectively, as is diagramatically shown in FIG. 5. As a result of the manner in which the cables are arranged the beams 9 may be slightly nonparallel. This provides a considerable simplification of the system. In addition, the cables 7 will always have a fixed and equal tension in consequence of the counterweight 12, thereby providing smooth movement of the sludge suction unit.

Figure 6:
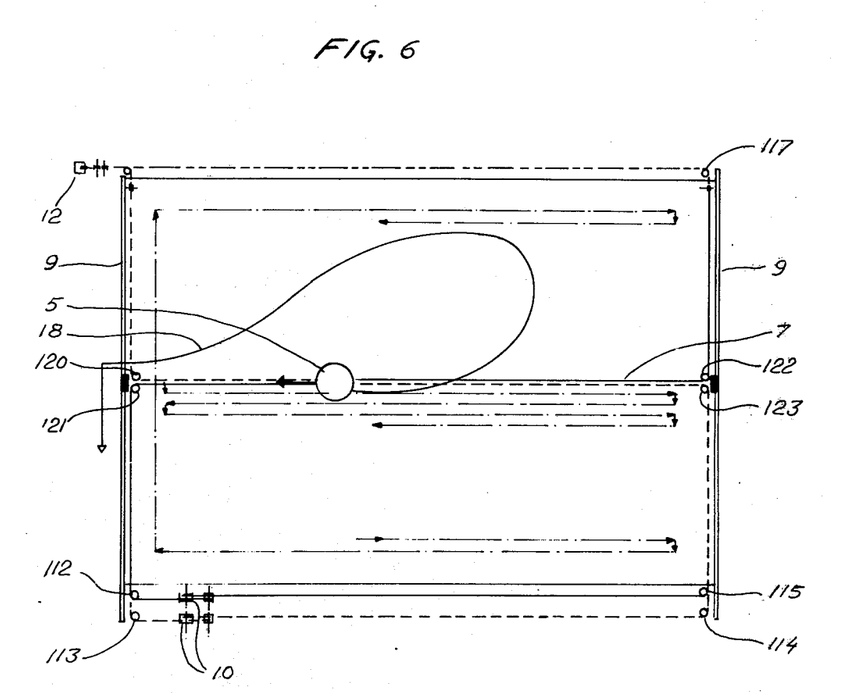
FIG. 6 shows an example of a movement diagram of the travel movement of the sludge suction unit in automatic operation.

FIG. 6 shows an example of a movement diagram of the sludge suction unit, wherein the arrows illustrate the direction of movement of the sludge suction unit. The unit is conveyed forwardly from one end of the basin to the second end substantially parallel to one elongate side of the basin and one step in crosswise direction at the second end, thereafter back parallel to the elongate side until the first end is reached. Then, the unit is conveyed another step in a crosswise direction, thereupon forwardly parallel to the elongate side, etc., until the sludge suction unit has reached the second elongate side of the basin. Thereupon, it is conveyed along said one end of the basin to the one elongate side and thereafter begins its motion again from there. The direction of movement can be the same as the direction of flow or at right angles thereto. The basin can also have its greatest elongation at right angles to the travel movement of the sludge suction unit. Signals or pulses for controlling the movement of the sludge suction unit are provided by signal or pulse means 23 which are located on the cables in front of the sludge suction unit (compare FIG. 3). The pulse means, when contacting for example the cable guide carriages 8, deliver pulses for reversing the direction of rotation of the drive motors of the cables 7 controlling the movement of the sludge suction unit in the basin. Limit switches 24 (compare FIG. 5) are disposed at the ends of the beams along the elongate sides of the basin, in which beams the cables 7 also extend. These limit switches provide signals or pulses for new pump cycles. In the reciprocating movement of the sludge suction means illustrated in FIG. 6, the crosswise displacement at each end of the basin may be approximately one meter in a practical case, and when the entire basin has been covered the sludge suction unit returns to its starting position at the opposite end of the basin, whereafter a new cycle is initiated.

The advantage of the signal or above-mentioned pulse means 23, which for example may consist of contacts dispose directly on the cables, is that they are simple and permit the sludge suction unit to reverse at some distance from land.

Figure 9:
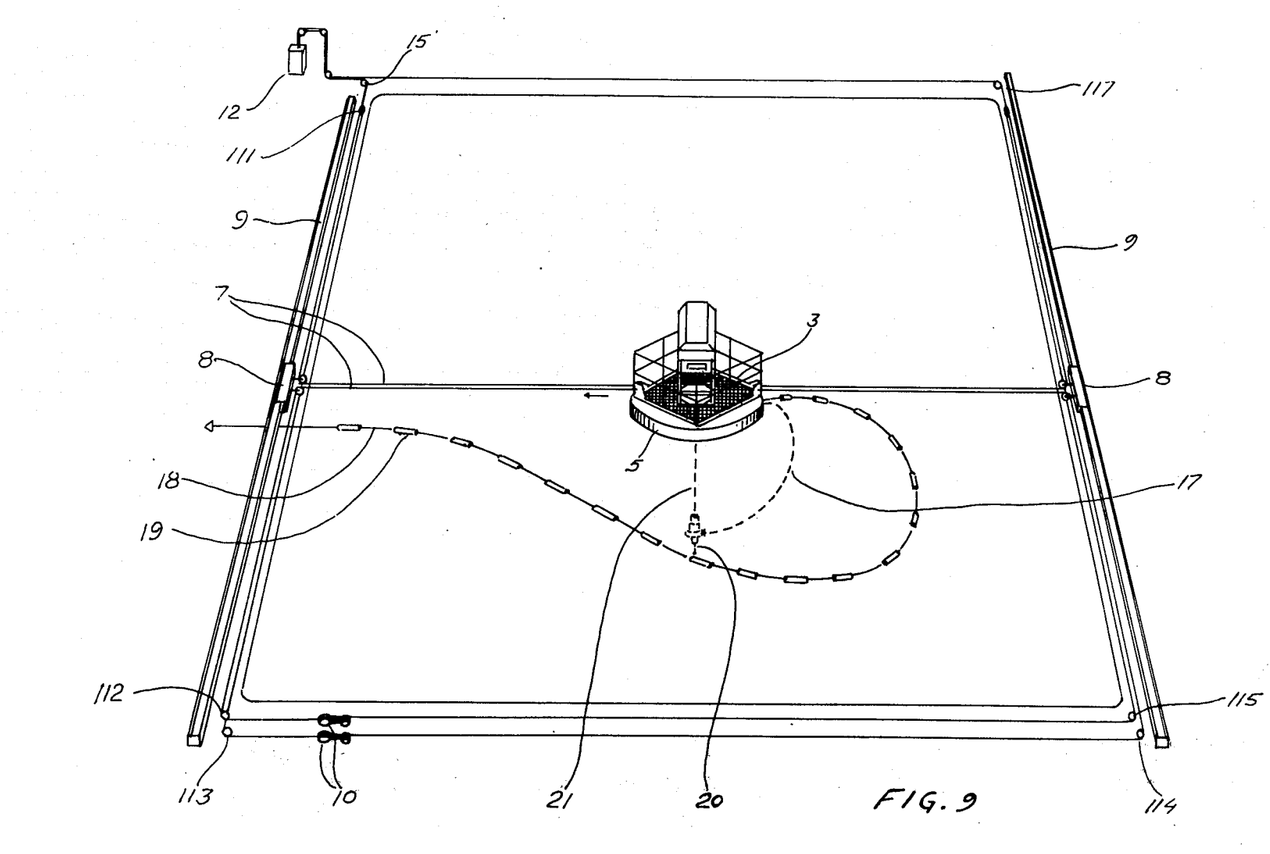
FIG. 9 is a perspective view which shows the sludge suction unit of the invention on an enlarged scale and illustrates the operating principle of the sludge suction unit.

The depth of the bottom of the basin may vary, and therefore it is necessary to be able to adjust the pump depth, which is performed by the sludge pump 1 being provided with a bottom sensor 20, as is illustrated in FIGS. 3 and 9, respectively. If the pump engages the bottom of the basin the suspension line 21 will drag, and information about this draging will be conveyed by bottom sensor 20 to a limit switch located at the end of a slot (not shown) in the bottom portion 5 of the sludge suction float for delivering pulses causing the cable 21 to be pulled upwards and the pump to be raised. When the bottom sensor 20 of the pump has become disengaged from the basin bottom, the cable 21 will become vertical again and the bottom sensor will react to this, whereupon the pump is lowered again.

Pumping may be carried out continually both day and night or during a shorter period, depending on the amount of sludge to be removed. Alternatively, it is possible to pump half of the basin clean every other time. The mode of operation described above is entirely automatic, but if desired the sludge suction unit may alternatively be operated manually.

The cable guide arrangement shown in FIG. 5 is designed such, that if the two drive motors 10 are made to rotate in the same directions the sludge suction unit will reciprocate between the line guide carriages 8. If, contrary to this, the motors are made to rotate in opposite directions the sludge suction unit will be conveyed along the beams 9 and thus at right angles to the movement just mentioned. As has been mentioned above the two drive motors may to advantage be provided with variators, whereby the speed of the sludge suction unit may be altered continually in operation, and the drive motors may furthermore be provided with automatic equipment known per se for ensuring that their speeds are exactly equal. The principle of the cable guidance is such, that no damage can occur if one of the drive motors should happen to become inoperative concurrently with the other drive motor still being operative. In this case the sludge suction unit will only deviate 45° from the normal direction.

Figure 7:
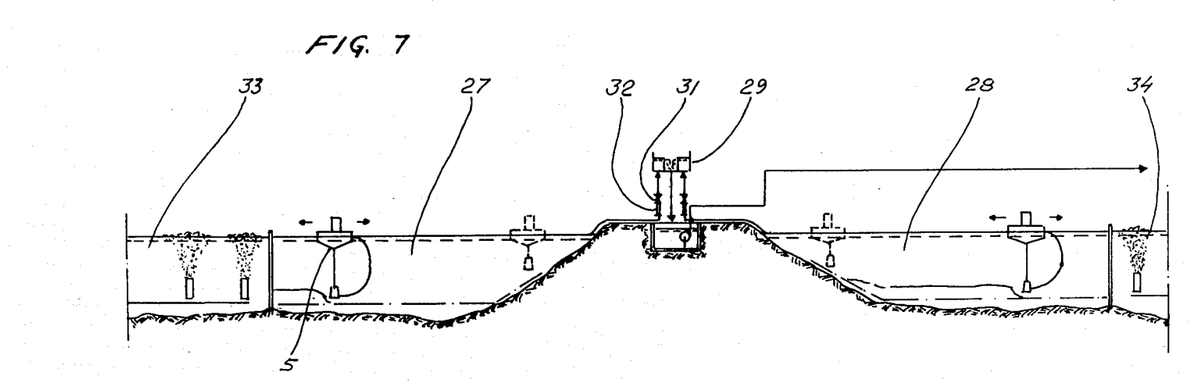
FIG. 7 is a side view illustrating how the sludge pump, which is suspended in a hoist block, automatically follows the bottom of the basin as the result of the sludge pump having a specific sensor.
Figure 8:
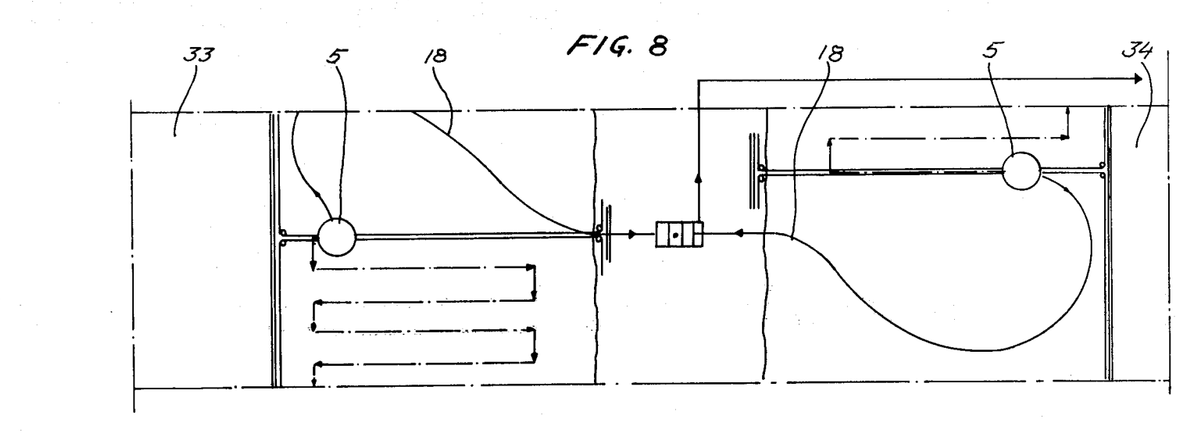
FIG. 8 is a view taken from above and corresponding to FIG. 7.

The left portions of FIGS. 7 and 8 show a sludge suction unit in two different positions in a pre-sedimentation basin 27, whereas the right portions show a sludge suction unit in two positions in a post-sedimentation basin 28. In order that a maximum concentration of liquid may be ejected the pump line is provided with a flowmeter 32 and a control valve 31 which is throttled down when the concentration is low and the flow is great and which is opened when the concentration is high and the flow is small. In order to make it possible to clean the line and pump in the event that they become clogged, the pump line is connected to a level box 29 which is located at a higher level than the sludge suction unit. If the flow ceases the pump will stop for a short period as the result of a pulse emanating from the flowmeter 32, with the contents of the box 29 flowing out the back way and cleaning out the line and the pump, whereafter the latter will be started again.

For the sake of completeness FIGS. 7 and 8 illustrate aeration basins 33 and 34 connected to the settling basins. In FIG. 8 the arrangement of FIG. 7 is illustrated from above, and examples of the path along which the sludge suction unit is conveyed are illustrated in dash-dot lines.

The invention is not restricted to the embodiment described above and illustrated in the drawings, and this embodiment solely comprises an example of the invention and of the manner in which it is utilized.

What is claimed is:

1. A continually operating, completely automatic sludge suction unit for settling basins, comprising
    (a) a float,
    (b) an independent sludge pump which is separate from said float,
    (c) means for automatically propelling said float on the surface of liquid in the basin,
    (d) cable means for suspending said independent sludge pump from said float, and
    (e) spoil line means for connecting said sludge pump to the float for withdrawing sludge from the bottom of the basin.

2. A continually operating, completely automatic sludge suction unit for settling basins, comprising
    (a) a float,
    (b) an independent sludge pump which is separate from said float,
    (c) means for automatically propelling said float on the surface of liquid in the basin,
    (d) cable means for suspending said independent sludge pump from said float, and
    (e) spoil line means for connecting said sludge pump to the float for withdrawing sludge from the bottom of the basin, wherein said means for propelling said float comprise
    (f) two cable guide beams disposed on opposite sides of the basin substantially parallel to elongate sides thereof,
    (g) a cable guide carriage provided with two cable guide wheels adapted to run in each beam,
    (h) first cable control wheels mounted substantially at one end of the basin between each beam and the respective elongate sides of the basin or an imaginary extension thereof,
    (i) second and third cable control wheels mounted at the opposite end of the basin between each beam and in imaginary extension of the elongate sides of the basin, (j) a first control cable running from one side of the float to one of the cable control wheels on said one cable guide carriage, furthermore to said first cable control wheel, from there to the second cable control wheel on the same side of the basin as said first cable control wheel, thereafter to the second cable control wheel at the opposite side of the basin, thereupon to one cable control wheel of the second cable guide carriage and back to the other side of the float, (k) a second control cable extending from one side of the float to the second cable control wheel on said one cable guide carriage, furthermore to the third cable control wheel located on the same side of the basin as the first cable control wheel, thereupon to the third cable control wheel on the opposite side of the basin, thereafter to the first cable control wheel on said opposite side of the basin, then to the second cable control wheel of the second cable guide carriage, and back to the other side of the float, (l) electric contacts disposed on the float or the cables connected thereto, (m) drive motors for said cables, said electric contact being adapted to engage the respective cable guide carriages for actuating said drive motors so that the sludge suction unit is conveyed repeatedly a predetermined distance along one of the cable guide beams and thereafter is conveyed transversely in the basin at right angles to the beams, and (n) signal-delivering means disposed close to the ends of said beams and being adapted to deliver signals for new pump cycles upon being engaged by the cable guide carriages.

3. A sludge suction unit in accordance with claim 2, wherein the two first cable control wheels are mounted in bearings connected to a common counterweight.

4. A sludge suction unit in accordance with claim 1, wherein the float consists of a rotatable lower portion and an upper portion which is stationary with respect to said lower portion.

5. A continually operating, completely automatic sludge suction unit for settling basins, comprising
 (a) a float,
 (b) independent sludge pump which is separate from said float,
 (c) means for automatically propelling said float on the surface of liquid in the basin,
 (d) cable means for suspending said independent sludge pump from said float, and
 (e) spoil line means for connecting said sludge pump to the float for withdrawing sludge from the bottom of the basin, wherein said sludge pump is provided with a bottom sensor which is adapted to follow the bottom of the basin and to actuate means in said float for causing the sludge pump to be elevated when the sludge pump is dragged on the bottom of the basin.

6. A sludge suction unit in accordance with claim 5, wherein said actuated means comprise a slot in the float, said slot being provided with limit switches at its ends.

* * * * *

UNITED STATES PATENT AND TRADEMARK OFFICE
CERTIFICATE OF CORRECTION

PATENT NO. : 4,152,800
DATED : May 8, 1979
INVENTOR(S) : Nils Olof Nilsmar

It is certified that error appears in the above-identified patent and that said Letters Patent are hereby corrected as shown below:

Column 2, Line 4, "many" s/b --may--

Column 2, Line 13, insert --the-- between "and" and "float"

Column 2, Line 22, "on" should be --or--

Column 2, Line 35, "rediprocating" s/b --reciprocating--

Column 2, Line 46, "couter" s/b --counter--

Column 3, Line 26, --signal or-- s/b inserted between "above-mentioned" and "pulse"

Column 3, line 26, after "the" "signed or" should be deleted.

Signed and Sealed this

Twenty-third Day of October 1979

[SEAL]

Attest:

RUTH C. MASON
Attesting Officer

LUTRELLE F. PARKER
Acting Commissioner of Patents and Trademarks